United States Patent [19]

Younger

[11] Patent Number: 4,874,935
[45] Date of Patent: Oct. 17, 1989

[54] SMART CARD APPARATUS AND METHOD OF PROGRAMMING SAME

[75] Inventor: Thomas L. Younger, Minnetonka, Minn.

[73] Assignee: Data Card Coprporation, Minneapolis, Minn.

[21] Appl. No.: 253,873

[22] Filed: Oct. 5, 1988

Related U.S. Application Data

[63] Continuation of Ser. No. 838,095, Mar. 10, 1986, abandoned.

[51] Int. Cl.⁴ ............................................. G06K 19/06
[52] U.S. Cl. .................................. 235/492; 235/379; 235/375
[58] Field of Search ............... 235/375, 379, 380, 441, 235/492

[56] References Cited

U.S. PATENT DOCUMENTS

| | | |
|---|---|---|
| 3,971,916 | 7/1976 | Moreno . |
| 4,001,550 | 1/1977 | Schatz . |
| 4,007,355 | 2/1977 | Moreno . |
| 4,092,524 | 5/1978 | Moreno . |
| 4,102,493 | 7/1978 | Moreno . |
| 4,442,345 | 4/1984 | Mollier et al. . |
| 4,471,216 | 9/1984 | Herve . |
| 4,498,000 | 2/1985 | Decavele et al. . |
| 4,544,833 | 10/1985 | Ugon . |
| 4,568,824 | 2/1986 | Gareis et al. . |
| 4,572,946 | 2/1986 | Schrenk . |
| 4,575,621 | 3/1986 | Dreifus . |
| 4,578,573 | 3/1986 | Fues et al. . |
| 4,580,041 | 4/1986 | Walton . |
| 4,590,365 | 5/1986 | Okada ............................. 235/492 X |
| 4,591,974 | 5/1986 | Dornbush et al. ................... 364/200 |
| 4,650,975 | 3/1987 | Kitchener . |
| 4,650,981 | 3/1987 | Foletta ............................ 235/492 X |
| 4,654,512 | 3/1987 | Gardosi . |
| 4,667,088 | 5/1987 | Kramer et al. . |
| 4,683,372 | 7/1987 | Matsumoto ..................... 235/380 X |
| 4,697,073 | 9/1987 | Hara . |
| 4,701,601 | 10/1987 | Francini et al. . |
| 4,709,137 | 11/1987 | Yoshida . |
| 4,736,094 | 4/1988 | Yoshida . |

Primary Examiner—David L. Trafton
Attorney, Agent, or Firm—Merchant, Gould, Smith, Edell, Welter & Schmidt

[57] ABSTRACT

A smart card (20) including a microcomputer (40). The microcomputer (40) being programmed with a smart card control program (50) and a data dictionary (52) defining the data to be stored in the microcomputer.

13 Claims, 2 Drawing Sheets

SMART CARD APPARATUS AND METHOD OF PROGRAMMING SAME

This is a continuation of application Ser. No. 838,095, filed Mar. 10, 1986 now abandoned.

BACKGROUND OF THE INVENTION

The present invention relates to a smart card apparatus and a method for programming the same. More particularly, the present invention relates to a smart card apparatus and method for programming same with an open architecture approach.

Substantially flat, thin plastic articles such as credit cards, bank cards, driver licenses, membership cards, etc., are currently in widespread use. Recently, manufacturers of these cards have provided such cards with their own microcomputer. Such cards are commonly being referred to as smart cards. The potential uses for such smart cards are tremendous. For example, a smart card might contain a person's entire medical history, financial information, etc. In addition, such cards might be used to automatically debit one's bank account when purchasing items such as groceries, clothes, etc. In view of the large potential use of the smart card, a smart card and method for programming the same is required which will allow rapid mass production and personalization of such smart cards. Moreover, there is a need for a smart card wherein the data may be readily stored, altered, retrieved, and protected. In addition, there is a need for a smart card which can be readily adapted to different applications as they arise. Also, there is a need for a smart card which is very secure and resistant to tampering. The present invention solves this problem and many other problems associated with smart cards.

SUMMARY OF THE INVENTION

The present invention relates to a smart card apparatus including a microcomputer. The microcomputer is programmed to include a smart card control program. In addition, the microcomputer is programmed to include a data dictionary and personalized, user data.

The present invention also relates to a method of making a smart card as described above. The method includes the steps of programming the microcomputer with the smart card control program. Programming a data dictionary for defining the data, security and feature requirements of the smart card control program. Programming the microcomputer with application specific data and personalized user data.

The present invention provides a smart card that can be treated similar to a disk device wherein data may be stored, altered, retrieved and protected. The application developer (card issuer) defines the data environment as part of the application development and this definition resides in the smart card as a data dictionary along with the associated data elements. The present invention provides a smart card whose data can be accessed and used much in the same way that a disk based filing system is used.

Additionally, the present invention provides a generic smart card and associated utilities and development tools to the application community to assist in development of smart card application. The tools will be in the form of standard message formats and protocols to address the smart card. The message formats and protocols will preferably be ISO compatible.

The present invention provides a generic smart card apparatus which will be cheaper overall since there is one standard product.

Additionally, the present invention avoids the need for special masks which will result in better response time from suppliers of the microcomputer.

Yet another advantage of the present invention is that the time and cost of programming an application is reduced and therefore will facilitate use of smart card apparatus.

In a preferred embodiment of the present invention, the use of electrically erasable programmable read only memory (EEPROM) will enhance the logical lifespan of smart card apparatus by reusing memory resources.

Yet another advantage of the EEPROM embodiment of the present invention is that the EEPROM will allow modification of smart card apparatus in a much cheaper and faster manner than with EPROM based products, although EPROM might be used in certain applications.

Yet another advantage is that there is less risk in application development by the card issuer because the technical functions are already included. Moreover, this translates into reduced development time and cost.

Still another advantage of the present invention is its transparency to the actual microcomputer features. The microcomputer can be changed and such change will be transparent to the user. As prices and features change this is important since microcomputer products are quickly outdated.

A particularly advantageous feature of the present invention is that it enables the rapid, mass production of smart card apparatus. The microcomputers can be programmed with the smart card program prior to being associated with the smart card apparatus. Subsequently, the smart card apparatus can then be programmed for the particular application and programmed with personalized user data.

Another particular advantage of the present invention is the open ended architecture approach of the present invention which makes the smart card apparatus of the present invention very flexible and adaptable to different applications. The present invention utilizes predefined interfacing rules and a data dictionary which facilitates the open ended nature of the present invention.

Additionally, the present invention provides a smart card with increased security. Varying levels of security can be readily built into the smart card; for example, certain fields of data might be required to match; i.e., PIN number, or the smart card will be deactivated.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
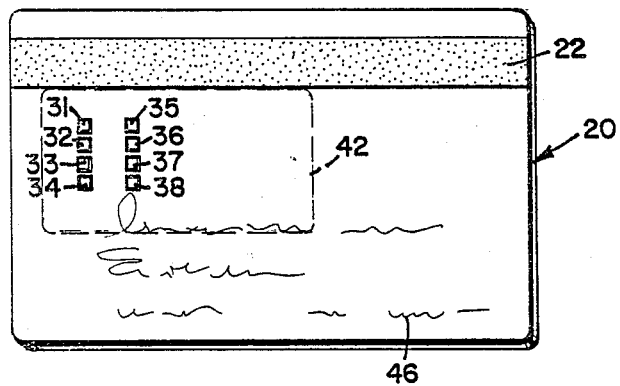
FIG. 1 is a diagrammatic top plan view of a smart card apparatus in accordance with the principles of the present invention.
Figure 2:
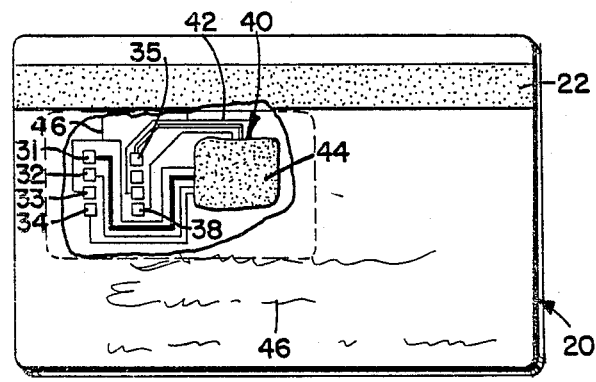
FIG. 2 i a view similar to that of FIG. 1 with a portion of the smart card apparatus broken away so as to disclose the microcomputer and its interconnection to exposed contacts.
Figure 3:
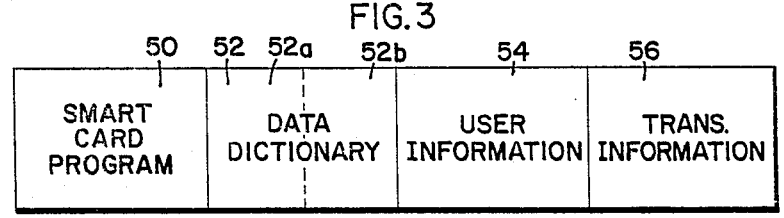
FIG. 3 is a diagrammatic view illustrating the general arrangement of microprocessor memory in accordance with the principles of the present invention.

Diagrammatically illustrated in FIG. 1 is an embodiment of a smart card apparatus in accordance with the principles of the present invention, the smart card being generally referred to by the reference numeral 20. In the embodiment illustrated, the smart card includes an encoded magnetic strip 22. Exposed are eight contacts 31-38 which enable access to a microcomputer 40 embedded in the smart card 20 on a support media 42. This is more clearly illustrated in FIG. 2 wherein a portion of the smart card has been broken away so as to illustrate the interconnections between the contacts 31-38 and the microcomputer 40. In the embodiment shown, the microcomputer is enclosed by a layer 44 so as to provide protection therefore. As illustrated, the smart card 20 might have written indicia 46 on the surface thereof; for example, the user's name and address.

An example of a microcomputer which might be utilized is the Motorola MC68HC805C4, a CMOS chip with approximately 4K EEPROM memory, 172 bytes of RAM, a timer, and a serial port (UART) through which all communication with the smart card reader will take place. CMOS and EEPROM are chosen for the preferred embodiment for a variety of reasons, most primarily are their adaptability to the concepts of the present invention and the extended life of the smart card.

The microcomputer 40 is programmed with a smart card control program 50, a data dictionary 52 which defines the data, security and feature requirements of the smart card program 50 and the particular application and personalized data.

The smart card program 50 and the microprocessor 40 follow the International Standard Organization (ISO standards; i.e. (ISO/TC 97/SC 17/WG 4N97 electronic signals and exchange protocalls, ISO/TC 97/SC 17/WG N166 dimension and location of contacts, and ISO/TC 97/SC 17/WG N105 physical characteristics).

The external card contacts 31-38 follow the ISO standards. The contexts are defined as follows: 31=VCC circuit supply voltage. 32=RST reset signal. 33=CLK clock signal. 34=RFU reserved. 35=GND ground. 36=VPP programming voltage. 37=I/O data I/O. 38=RFU reserved.

The EEPROM memory is divided into two zones referred to as Zone A and Zone B. Zone A will be used for volatile data storage such as transaction data 56 and Zone B will be used for code, data dictionary and storage of nonvolatile data. Data fields in Zone A of the preferred embodiment are stored in memory, from the low address to the high address and are formatted as data, field ID and length. (In this application, volatile data includes data subject to change when the smart card is in use.)

Data=Data value of field, trailing spaces truncated.

Field=The field identifiers defined in the data dictionary.

Length=The length of the field.

A data dictionary 52 is used to define the data stored in the smart card memory to the smart card program. The data dictionary defines for each data element how the data element is structured and if it is volatile or nonvolatile. This data will include both system data relating to manufacture of the card, application data relating to the specific smart card application; and personalized data relating to the end user of the smart card. The data dictionary 52 thus serves a template for the data stored in each smart card. This information is then included in each smart card that is created. The data dictionary will include a fixed portion 52a defined at the time the smart card control program 50 is programmed and a variable portion 52b containing definations of personalized data used in each application which will be defined when the smart card is personalized. The fixed portion, including both system and application data definitions, of the data dictionary might be defined as follows:

| USAGE | SOURCE |
| --- | --- |
| Total size of dictionary/data | System |
| Card Provider Code | Application |
| Application Code (internal) | Application |
| Application Code (ISO message) | Application |
| Internal Security Code | System |
| Manufacturing Batch | Application |
| Card Manufacture Date | System |
| Extended Commands (Y or N) | Application |
| Watchdog for dictionary | System |
| DCC application verification | Application |
| Unused | Application |
| Threshold of consecutive bad commands or field identifiers | |
| Action taken on threshold (I=Ignore, S=Sleep, K-Erase card) | Application |
| Number of variable fields in dictionary | System |
| Watchdog for personalization | System |

The application specific portion of the data dictionary will include definition of personalized data fields such as user data 54 and will be defined as follows:

| USAGE |
| --- |
| Data Field ID (x'00'-x'FE') |
| Length of Field |
| Data Attribute (Volatile/non-volatile/match) |
| Reader Permissions (2 types) |
| Writer Permissions (2 types, ignored if non-volatile) |

(It will be appreciated that the data dictionary may taken on varying contents and structure and still be in keeping with the principles of the present invention.)

Memory is reserved for the data defined by data dictionary when the microcomputer is programmed with the smart card control program 50. Moreover, the structure of the data dictionary will be predefined and the smart card program 50 will know the location of each of the elements of the data dictionary. A utility program, which might be used in a personal computer or other terminal, is used by the application user to interface with the smart card control program and define the data dictionary for personalized and application specific data and write the system data, application data, and personalized user data into the microcomputer memory. The utility program will include the data dictionary template and will query the user to define the application data of the fixed portion and the personalized data of the variable portion. Once the user has accomplished this at a personal computer terminal, the smart card can be personalized by writing the user data 54 to the smart card.

It will be appreciated that the above description is of a preferred embodiment and that alternate embodiments may take on different configurations in keeping with the principles of the present invention.

The smart card control program 50 performs command processing, service routines such as memory management, I/O driver, and specialized code for handling miscellaneous commands from the programming equipment of the application user. The smart card control program will contain logic to load/reload cards so as to allow refreshing or updating of a smart card. This will enable new code, and new data to be introduced to a previously used smart card as a command, rather than through various boot strap procedures as is done at initial load time. Communication with the smart card program will be accomplished by predefined interfacing rules.

Service functions are those routines which address diagnostic and technical issues rather than the execution of specific commands; for example,

1. INITIALIZATION

The initialization process is invoked at power up or following a Reset. The functions performed are:
   initialize hardware states
   check if "BOOT2" present (live vs personalized)
   if "BOOT2" present do card personalization
   check watchdogs for card validity
   find the next volatile write location in Zone A.
   find the end of the non-volatile data in Zone B.

2. SECURITY VALIDATION

If application security verification has been activated for this application it is done immediately after the initialization. This involves putting the I/O into read status, accepting the verification message and validating against the values in the Data Dictionary. The values are returned as in the data portion of the "V" recorded. If successful the terminal type is saved for field verification. Also a message is returned to the application as a positive response to the security validation. If there is a 'Match' field defined in the dictionary this fields data must be included as additional information is the verification record and is compared with the data in the card. If there is no match a bad status is returned to the application.

3. DICTIONARY SEARCH

From the field identifier in the message locate the field in the dictionary and stash the address for further usage (save the index value).

4. MEMORY SEARCH

The memory search will be supplied with a field ID and a command (next, most recent etc.). If application validation is active the field security is checked to determine if the user may access the field. With the supplied arguments memory will be searched for the data field and the data placed into the RAM buffer in the data portion of the buffer area. If data is not found a status message is stored in buffer area.

On the first request of a field the dictionary is inspected to determine whether the field is volatile or non-volatile and the address generated will be either the address of the next available byte minus one in Zone A, or the end of the Zone B personalized data.

On multiple requests of a field the address will be that of the last occurrence accessed minus one.

A block move routine is used to move the data to the buffer from the address of the located data field.

When the last field of the supplied ID has been found, and a next read command is issued, the status message is stored in the buffer area.

5. WRITE TO MEMORY

The Data Dictionary attributes are checked to ascertain that the field is not a non-volatile field, and if the application validation is specified that the user may write this data. Having done the validations the routine will write the data portion of the RAM buffer into the EEPROM volatile memory and update address pointers to the next available area to write. Appended to the data will be the field identifier and length.

7. MEMORY REFRESH

Memory Refresh is part of the 'reorg' of the card at the time the card is approaching full. A 'reorg' command from the appropriate terminal will cause the data Zone A to be erased.

The actual erase is a routine which is furnished zone id and may also be used to intentionally destroy the card on request.

In use, predefined commands are passed from the application terminal such as an automatic teller terminal (ATM) and are requests for some form of action. The commands fall into several major categories:

Application: Those which are issued by the application for a file request. Normally an ASCII alphabetic value.

System: Proprietary commands used to perform diagnostic functions.

Response: A card response back to the application conveying a status or acknowledgment. Normally ASCII numeric.

Reader: These commands instruct the device reading/writing to the smart card. These commands are ignored by the smart card.

Sample commands are:

| | | | |
|---|---|---|---|
| R | Read | applic. | Reads the most recent field value from the card to the application. |
| W | Write | applic. | Writes the data for the specified into memory from the application. |
| M | Memory | applic. | a request for amount of remaining memory in Zone A. This is returned as a two byte data value in the data portion of the record in hex format. |
| N | read Next | applic. | reads the next oldest occurrence of a field from the card to the application (First command gets the most recent, subsequent commands get next oldest, etc. The requests must be contiguous on a request for another field terminates the sequence). |
| V | validate | applic. | This command request contains the necessary security data to |

| | | | identify the reader and application to the card (required if application verification is set). |
|---|---|---|---|
| D | destroy | applic. | The application requests the total destruction of the card. The data portion contains the application and the Card Provider code. These must match the data dictionary values before this is allowed to happen. |
| C | clear | applic. | arbitrarily clear Zone A. Follows same rules as 'D', used as step in reorganizing a full card. |
| S | stop | applic. | orderly stop, required for battery powered products. |
| 1 | status | applic. | a response to the application from the card on an exception. The data portion of the mesaage will have the status returned. Examples are card full, field not found, I/O error, or an 'OK'acknowledgment. |
| P | program | reader | turns on programming voltage if applicable. |
| L | lock door | reader | locks door on reader to keep card. |
| U | unlock | reader | unlocks the door. |
| Z | reset | reader | issue a hardware reset. |
| x'EO' | set mode | system | a preliminary command required to set system mode. No other system commands can be recognized unless sytem mode has been set. |
| x'EA' | erase/reload | system | Loads bootstrap to RAM, erases both zones of EEPROM and then reloads memory from serial port |
| x'EB' | dump dict. | system | dump the entire dictionary out serial port. |
| x'ED' | dump all card | system | pass entire card as data portions of multiple records. |

It will be appreciated that the smart card control program (50) might take on any number of different embodiments. A program structure for one such embodiment is illustrated below:

| | |
|---|---|
| A. | SMART CARD (Entry Point) |
| A.1 | INITIALIZATION |
| A.1.1. | SET HARDWARE STATES |
| A.1.2 | DETERMINE MODE |
| A.1.2.1 | Check if live or personaliztion (Boot2) |
| A.1.2.2. | If personalization |
| A.1.2.2.1 | Invoke Boot2 to load data |
| A.1.2.2.2 | Clear Zone A |
| A.1.2.2.3 | reset RAM pointers |
| A.1.2.2.4 | Check errors (checksum, I/O) |
| A.1.2.2.5 | Pass completion [ACK/NAK1/NAK2 (pick one depending on result)] |
| A.1.3 | CHECK WATCH DOGS |
| A.1.3.1 | Check System Watch Dogs |
| A.1.3.2 | Check Application Watch Dogs |
| A.1.4 | INITILIZE RAM |
| A.1.4.1 | Determine next write address |
| A.1.4.2 | Set variables to initial values |
| A.1.5 | RESPONSE TO RESET (per ISO spec) |
| A.1.6 | APPLICATION VALIDATION |
| A.1.6.1 | Determine if required |
| A.1.6.2 | Read validation message from terminal |
| A.1.6.2.1 | Serial I/O Driver in read mode |
| A.1.6.3 | Validate application ID |
| A.1.6.4 | Save Terminal Type |
| A.1.6.5 | Calculate remaining memory in card |
| A.1.6.6. | Return status message to application |
| A.2 | COMMAND PROCESSOR |
| A.2.1 | READ REQUEST |
| A.2.1.1 | Serial I/O Driver in read mode |
| A.2.1.2 | Verify message |
| A.2.2 | VERIFY COMMAND |
| A.2.2.1 | check command list |
| A.2.3 | CHECK ABEND STATUS |
| A.2.3.1 | Do if over defined error threshold |
| A.2.3.1.1 | if "ignore"continue |
| A.2.3.1.1 | if "deaf & dumb"STOP processor |
| A.2.3.1.2 | if "kill"do DESTROY command |
| A.2.4 | PROCESS THE COMMAND |
| A.2.4.1 | SYSTEM COMMAND |
| A.2.4.1.1 | VALIDATE AUTHORITY |
| A.2.4.1.1.1 | Check data portion of record for DCC special sequence |
| A.2.4.1.1.2 | If not present bump error count, exit |
| A.2.4.1.1.3 | If not a Set Mode and not in system mode bump error count and exit |
| A.2.4.1.2 | SET MODE |
| A.2.4.1.2.2 | set system into the "system mode" |
| A.2.4.1.3 | ERASE/RELOAD CARD |
| A.2.4.1.3.1 | Clear Zone A |
| A.2.4.1.3.2 | Set up RAM instruction sequence |
| A.2.4.1.3.3 | Clear Zone B from RAM |
| A.2.4.1.3.4 | branch to ROM Boot to begin reload |
| A.2.4.1.4 | DUMP DICTIONARY |
| A.2.4.1.4.1 | Set dump range as dictionary through personalized data DUMP command. |
| A.2.4.1.5 | DUMP CARD |
| A.2.4.1.5.1 | Set dump Range = $00 - End of personalized Data DUMP command |
| A.2.4.1.6 | DUMP |
| A.2.4.1.6.1 | Set ranges to dump |
| A.2.4.1.6.2 | Set record preamble |
| A.2.4.1.6.3 | Dump entire range as standard formatted records |
| A.2.4.2 | APPLICATION COMMAND |
| A.2.4.2.1 | Set mode as "application Mode" |
| A.2.4.2.2 | Find field in Data Dictionary |
| A.2.4.2.3 | Verify Permissions |
| A.2.4.2.4 | Route to Command |
| A.2.4.2.5 | READ COMMAND |
| A.2.4.2.5.1 | Get Address of Card Data |
| A.2.4.2.5.1.2 | Read most recent |
| A.2.4.2.5.1.2 | Read Next NOTE: Read next will always bet "only"non-volatile field each time |
| A.2.4.2.5.2 | Block move EEPROM to RAM data portion of buffer |
| A.2.4.2.5.3 | Build rest of message (ISO format) |
| A.2.4.2.5.4 | Write message back to terminal |
| A.2.4.2.6.4.1 | Serial I/O driver in write mode |
| A.2.4.2.7 | WRITE COMMAND |
| A.2.4.2.7.1 | Get next address to write to |
| A.2.4.2.7.2 | Check for Zone full |
| A.2.4.2.7.3 | If full send status message indicating full |
| A.2.4.2.7.4 | Do STATUS MESSAGE |
| A.2.4.2.7.5 | Exit |
| A.2.4.2.7.6 | Write each byte from data portion of I/O buffer to EEPROM |
| A.2.4.2.7.7 | Set field and length flags in EEPROM |
| A.2.4.2.7.8 | Update RAM address of next available byte to write to |
| A.2.4.2.7.9 | Format successful status message |
| A.2.4.2.7.10 | Do STATUS MESSAGE |
| A.2.4.2.8 | CLEAR COMMAND |
| A.2.4.2.8.1 | Validate Provider, terminal and application |
| A.2.4.2.8.2 | Clear Zone A |
| A.2.4.2.8.3 | Write sentinel record in 1st byte Zone A |
| A.2.4.2.8.4 | Reset Pointers |
| A.2.4.2.9 | DESTROY COMMAND |
| A.2.4.2.9.1 | Validate Provider, terminal and appln. |
| A.2.4.2.9.2 | Clear Zone A |
| A.2.4.2.9.3 | Set up RAM erase sequences |
| A.2.4.2.9.4 | Clear Zone B |
| A.2.4.2.10 | STOP COMMAND |
| A.3 | ROUTINES |

-continued

| | |
|---|---|
| A.3.1 | STATUS MESSAGE |
| A.3.1.1 | Set preamble |
| A.3.1.2 | SERIAL I/O |
| A.3.2 | SERIAL I/O DRIVER |
| A.3.2.1 | READ MODE |
| A.3.2.2 | WRITE MODE |
| A.3.3 | BLOCK MOVE TO RAM BUFFER |
| A.3.3.1 | Get beginning address of send area |
| A.3.3.1 | Get length |
| A.3.3.3 | Set OP code and beginning of buffer address |
| A.3.3.4 | MOVE EACH BYTE |
| A.3.3.4.1 | alter instruction address |
| A.3.3.4.2 | perform instruction and RTS in RAM |

The initial state of the microcomputer is shown as follows:

| RAM | | ZONE A EEPROM (2304 bytes) | | ZONE B EEPROM (1792 bytes) | |
|---|---|---|---|---|---|
| 176 bytes RAM | | | | | |
| $0050 | $00BF | $0100 | $09FF | $0A00 | $10FF |

Figure 4:
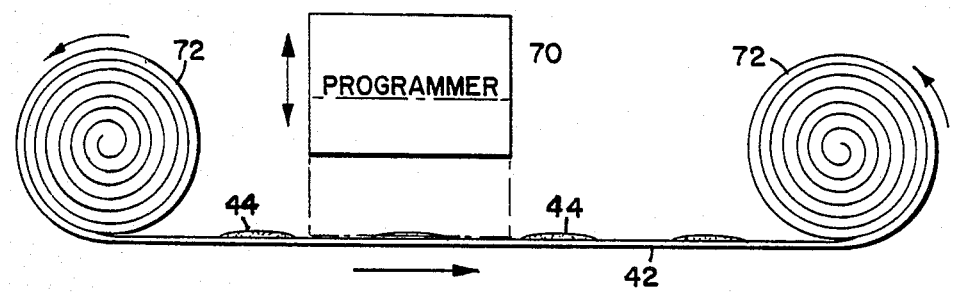
FIG. 4 diagrammatically illustrates an arrangement for programming of the microprocessor and memory in accordance with the principles of the present invention.

The ROM bootstrap (Boot0) which comes with the microcomputer loads Boot1 into RAM address space beginning at $0050. Control is then passed to Boot1 which loads the smart card control program 50, Boot2 which will subsequently personalize the smart card, and vectors to pass subsequent control to the application. The programming of the microcomputer with the smart card control program 50 is preferably done by program equipment 70 while the microcomputer 40 is on the carrier substrate 42 but is not yet imbedded in the smart card 20 as generally illustrated in FIG. 4. As illustrated, the carrier substrate 42 might be fed from and to tape-like reels 72. The programmer equipment 70 has the standard ISO contacts as well as the switch contact which will direct execution to the ROM bootstrap. The results of the smart card load are acknowledged from the smart card. No response or a NAK will result in the carrier being scored/holed so that the part is recognizable and personalization time is bypassed. Also, provision is made to disable the circuitry, or vectors for loading the smart card. The memory map after loading the smart card control program through Boot1 is illustrated below:

| RAM | | ZONE A EEPROM (2304 bytes) | | ZONE B EEPROM (1792 bytes) | |
|---|---|---|---|---|---|
| 176 bytes RAM -1- | B O O T 2 | initialized | | SMART CARD CONTROL PROGRAM | |
| $0050 | $00BF | $0100 | $09FF | $0A00 | $10FF |

In use, at the time of initial personalization of the smart card 20 by the application user, the smart card control program 50 at the time of being powered up will recognize that Boot2 is present in memory and will perform that function. Boot2 will load data dictionary 50 and personalization data into memory Zone B, load the personalized user data into the smart card 20 beyond the data dictionary, erases Boot2 from memory Zone A, and writes a Sentinal to indicate the beginning of Zone A. The card personalization process is initiated by an interactive process which defines, batch, date, customer and data dictionary to use. This extracts the necessary information to define the user's input and the fixed data to include in the data dictionary. Personalization data is preferably stored on a suitable storage media and read in by the utility program and written to a smart card as it passes a reader. The chip carrier might have been imbedded into the smart card prior to the personalization process so as to reduce waste or might later be imbedded in the smart card. In any event, the contacts 31-38 are presented to the card personalization terminal which will be programmed to interface with the smart card control program 50. Power is applied to the smart card and the smart card will initiate dialog with the personalization terminal. After personalization, the memory map will appear as follows:

| RAM | | ZONE A EEPROM (2304 bytes) | | ZONE B EEPROM (1792 bytes) | |
|---|---|---|---|---|---|
| 176 bytes RAM -1- | S N T L | initialized | SMART CARD CONTROL PROGRAM | DATA DICT. | USER DATA |
| $0050 | $00BF | $0100 | $09FF | $0A00 | $10FF |

Transactions are entered by the smart card being placed in a reader and the application program issuing commands to write data to the smart card. The data is written in the next available location. The smart card of the present invention has the capability to reinitialize Zone A of the memory and reload selected transactions to make room for more. During transaction processing the memory map generally appears as follows:

| RAM | | ZONE A EEPROM (2304 bytes) | | | ZONE B EEPROM (1792 bytes) | |
|---|---|---|---|---|---|---|
| 176 bytes RAM -1- | Trans. | initialization | SMART CARD CONTROL PROGRAM | | DATA DICT. | USER DATA |
| $0050 | $00BF | $0100 | $09FF | $0A00 | | $10FF |

It is to be understood that even though the above numerous characteristics and advantages of the invention have been set forth in the foregoing description, together with details of the structure function of the invention, the disclosure is illustrative only, and changes may be made in detail, especially in matters of shape, size and arrangement of parts within the principle of the invention, to the full extent indicated by the broad general meaning of the terms in which the appended claims are expressed.

What is claimed is:

1. A method for making a smart card including a microcomputer; the method comprising the steps of:

a. programming the microcomputer with a smart card control program;
b. defining data dictionary means for defining data stored in the microcomputer; and
c. programming the microcomputer with the data dictionary means and personalized data.

2. A method in accordance with claim 1, wherein the step of programming the microcomputer with a smart card control program includes defining predetermined commands for accessing the smart card control program.

3. A method in accordance with claim 1, wherein the method of defining data dictionary means includes defining data dictionary means with a fixed portion and a variable portion.

4. A method in accordance with claim 1 wherein the step of programming the microcomputer with the data dictionary and personalized data includes the step of using a utility program at a terminal for interfacing with the smart card control program previously programmed in the microcomputer of the smart card.

5. A method in accordance with claim 1, wherein the step of programming the microcomputer with personalized data includes defining a data field ID, a length of field, and data attribute.

6. A method in accordance with claim 5, wherein the step of defining the data attribute includes defining the data as volatile, non-volatile, or match, whereby if defined as match the personalized data stored in the smart card must match the data input thereby providing a security check.

7. A method in accordance with claim 1, wherein the step of defining the data dictionary means includes defining application specific data and personalized data.

8. A method for making a smart card including a microprocessor, the method comprising the steps of:
a. programming the microcomputer with a smart card control program;
b. allocating memory for data dictionary means for defining data stored in the microcomputer;
c. programming data values into the data dictionary area of memory; and
d. programming the microcomputer with personalized data.

9. A method in accordance with claim 8, wherein volatile and non-volatile areas of memory are defined for storage of data.

10. A method in accordance with claim 9, wherein the step of programming the microcomputer with a smart card control program includes defining commands for retrieving, storing, altering and protecting data.

11. A method for making a smart card including a microcomputer embedded in the smart card; the method comprising the steps of:
a. programming the microcomputer with a smart card control program before embedding the microcomputer in the smart card;
b. defining data dictionary means, of predetermined structure known to the smart card control program, for defining data stored in the microcomputer, the step of defining data dictionary means including the step of defining a first fixed portion of the data dictionary means including system and application data definitions and subsequently defining a second variable portion of the data dictionary means including personalized data definitions;
c. embedding the microcomputer in the smart card; and
d. personalizing the smart card including programming the microcomputer with the data dictionary means and personalized data, the second variable portion of the data dictionary means being defined prior to programming the microcomputer with the data dictionary means.

12. A method in accordance with claim 11 wherein the personalizing step includes the step of utilizing utility program means for interfacing with the smart card control program embedded in the smart card to define the second portion of the data dictionary means, the utility program means querying a user to define the personalized data.

13. A method in accordance with claim 12 wherein the step of programming the microcomputer includes the step of powering up the smart card program which in turn will load the data dictionary means and the personalized data into memory.

* * * * *

UNITED STATES PATENT AND TRADEMARK OFFICE
CERTIFICATE OF CORRECTION

PATENT NO. : 4,874,935
DATED : October 17, 1989
INVENTOR(S) : Thomas L. Younger

It is certified that error appears in the above-identified patent and that said Letters Patent is hereby corrected as shown below:

Front page, Assignee: "Coprporation" should be --Corporation--.

Col. 2, lines 18 & 19, "EPROM" should be --EEPROM--.

Col. 3, line 1, "i" should be --is--.

Col. 3, line 49, "protocalls" should be --protocols--.

Col. 4, line 17, "definations" should be --definitions--.

Col. 4, line 35, "Application" should be moved down 1 line.

Col. 4, line 56, "taken" should be --take--.

Col. 7, line 49, "personaliztion" should be --personalization--

Col. 7, line 58, "initilize" should be --initialize--.

Signed and Sealed this

Twenty-sixth Day of March, 1991

*Attest:*

HARRY F. MANBECK, JR.

*Attesting Officer*    *Commissioner of Patents and Trademarks*